United States Patent
Pöllny et al.

(10) Patent No.: US 12,096,320 B2
(45) Date of Patent: Sep. 17, 2024

(54) METHOD FOR TRANSMITTING A DATA PACKET FROM A CENTRAL ELECTRONIC COMPUTING DEVICE TO AT LEAST ONE MOBILE TERMINAL DEVICE, AND NETWORK SYSTEM

(71) Applicant: DAIMLER AG, Stuttgart (DE)

(72) Inventors: Oliver Pöllny, Stuttgart (DE); Philipp Schindler, Karlsruhe (DE); Bianca Mix, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 374 days.

(21) Appl. No.: 17/634,647

(22) PCT Filed: Jul. 14, 2020

(86) PCT No.: PCT/EP2020/069840
§ 371 (c)(1),
(2) Date: Feb. 11, 2022

(87) PCT Pub. No.: WO2021/028143
PCT Pub. Date: Feb. 18, 2021

(65) Prior Publication Data
US 2022/0353656 A1    Nov. 3, 2022

(30) Foreign Application Priority Data
Aug. 13, 2019  (DE) .................... 10 2019 005 675.2

(51) Int. Cl.
*H04W 4/48*  (2018.01)
(52) U.S. Cl.
CPC .................... *H04W 4/48* (2018.02)

(58) Field of Classification Search
CPC .................................................... H04W 4/48
See application file for complete search history.

(56) References Cited

U.S. PATENT DOCUMENTS 8,447,231 B2    5/2013 Bai et al.
9,842,496 B1 *  12/2017 Hayward ................. H04Q 9/00
(Continued)

FOREIGN PATENT DOCUMENTS

CN    102197689 A    9/2011
CN    103733655 A    4/2014
(Continued)

OTHER PUBLICATIONS

Intel et al.; "Use cases for mmWave and Mobile Edge computing, two building blocks of 5G networks: the vision of the European funded projects 5G-MiEdge;" 3GPP TSG-SA WG1 Meeting #78; S1-172212; May 8-12, 2017; Porto, PT.
(Continued)

*Primary Examiner* — Zhiren Qin
(74) *Attorney, Agent, or Firm* — PATENT PORTFOLIO BUILDERS PLLC

(57) ABSTRACT

A method for transmitting a data packet from a central electronic computing device to a mobile terminal device using a network system involves transmitting the data packet to an electronic computing device of a motor vehicle of the network system using a mobile telecommunications network. The transmitted data packet is transmitted locally from the electronic computing device using a local network, which is created by the electronic computing device, to the at least one mobile terminal device.

12 Claims, 1 Drawing Sheet

(56) References Cited

U.S. PATENT DOCUMENTS

| | | | |
|---|---|---|---|
| 11,026,073 B2 | 6/2021 | Haubner | |
| 2010/0138149 A1* | 6/2010 | Ohta | H04M 1/6091 |
| | | | 340/425.5 |
| 2015/0170522 A1* | 6/2015 | Noh | G08G 1/096741 |
| | | | 701/117 |
| 2019/0044779 A1* | 2/2019 | Wu | H04W 72/1215 |
| 2020/0107169 A1* | 4/2020 | Chin | H04L 61/5038 |
| 2020/0178349 A1* | 6/2020 | Edwards | H04W 88/04 |
| 2020/0275245 A1* | 8/2020 | Haubner | H04W 88/04 |

FOREIGN PATENT DOCUMENTS

| | | |
|---|---|---|
| CN | 103947231 A | 7/2014 |
| CN | 105493464 A | 4/2016 |
| CN | 108064071 A | 5/2018 |
| DE | 102011116972 A1 | 6/2012 |
| DE | 102012024869 A1 | 6/2014 |
| DE | 102015005237 A1 | 10/2016 |
| DE | 102017215710 A1 | 3/2019 |
| DE | 102017011766 A1 | 6/2019 |
| DE | 102017222905 A1 | 6/2019 |
| WO | 2018125686 A2 | 7/2018 |
| WO | 2019057330 A1 | 3/2019 |

OTHER PUBLICATIONS

Office Action dated Nov. 14, 2023 in related/corresponding CN Application No. 202080057081.2.
Office Action dated Apr. 9, 2024 in related/corresponding CN Application No. 202080057081.2.
Office Action created Apr. 26, 2023 in related/corresponding DE Application No. 10 2019 005 675.2.
International Search Report mailed Sep. 7, 2020 in related/corresponding International Application No. PCT/EP2020/069840.
Office Action created Jul. 28, 2020 in related/corresponding DE Application No. 10 2019 005 675.2.
Written Opinion mailed Sep. 7, 2020 in related/corresponding International Application No. PCT/EP2020/069840.

* cited by examiner

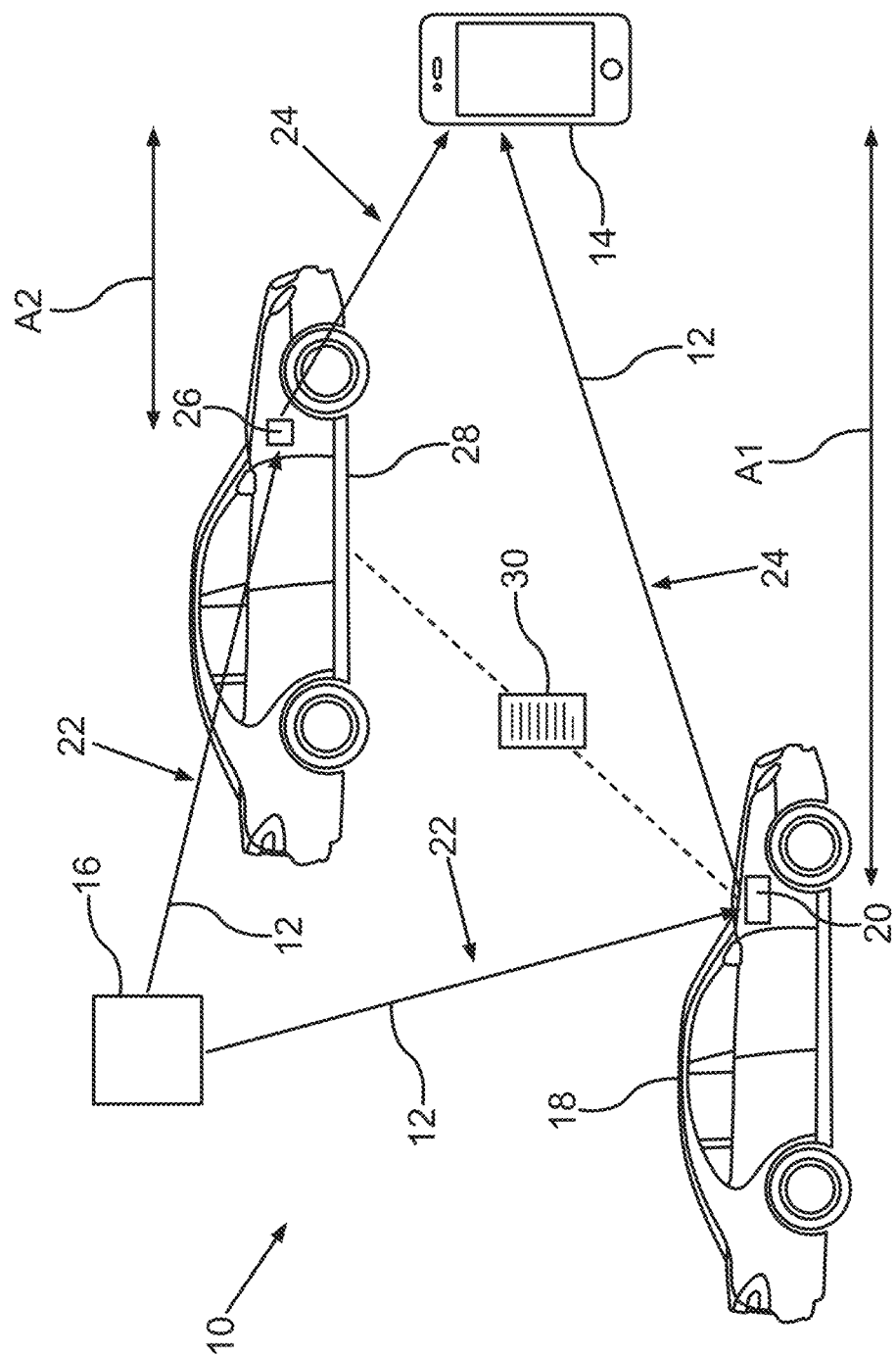

METHOD FOR TRANSMITTING A DATA PACKET FROM A CENTRAL ELECTRONIC COMPUTING DEVICE TO AT LEAST ONE MOBILE TERMINAL DEVICE, AND NETWORK SYSTEM

BACKGROUND AND SUMMARY OF THE INVENTION

Exemplary embodiments of the invention relate to a method for transmitting a data packet from a central electronic computing device to at least one mobile terminal device by means of a network system, as well as to a network system.

At present there are networks of regionally distributed servers connected via the Internet, which are also called Content Delivery Networks (CDN). These provide distributed operation of a plurality of central electronic computing devices. A customer may, for example by means of a mobile terminal device, now have data stored in this network. If the mobile terminal device now retrieves this file, the CDN will deliver the data from the server that is the shortest distance from the mobile terminal device. In the case of cable connections there is not always a direct relationship between short distance and small latency.

Moreover, a method for utilizing an arithmetic-logic unit of an autonomously movable vehicle is known from WO 2019/057330 A1. It is envisaged that during charging of an electrical energy storage unit of the vehicle, computing power of the computing unit is made available to at least one external computer network and/or a multi-computer system. The invention further relates to a vehicle configured for implementing the method.

The present invention is directed to a method and a network system, by means of which a faster transfer rate for transmitting a data packet can be achieved.

One aspect of the invention relates to a method for transmitting a data packet from a central electronic computing device to at least one mobile terminal device by means of a network system, in which the data packet is transmitted to an electronic computing device of a motor vehicle of the network system by means of a mobile telecommunications network.

It is envisaged that the transmitted data packet is transmitted locally from the electronic computing device by means of a local network, which is created by means of the electronic computing device, to the at least one mobile terminal device.

This makes it possible for the mobile terminal device to have, in particular, a small distance from the electronic computing device, so that the data packet can be transmitted quickly to the mobile terminal device.

In other words, it is envisaged that the data packet is stored on the motor vehicle. The motor vehicle also has a mobile radio link, by means of which the mobile telecommunications network can be generated. The mobile terminal device, which may be configured for example as a laptop, smartphone or as another motor vehicle, would now like to retrieve this data packet. An algorithm in the background determines, and in particular anonymizes, the location of the mobile terminal device and looks up in a list whether the motor vehicle is in the vicinity. The motor vehicle, in particular the electronic computing device, is now triggered by the central electronic computing device to make the data available to the mobile terminal device.

Precisely in a rural area, a fast transfer rate can thus be achieved, because shorter distances for transmitting the data packet are possible. Unused arithmetic-logic units and memory in the motor vehicle can thus optionally be avoided. Furthermore, an implied load distribution can take place in this way, because the load on the central electronic computing device is restricted to the enquiry for determining the actual information bearer and the genuine information or the genuine data packet is transmitted from another place.

According to an advantageous embodiment, the transmitted data packet is transmitted locally to the at least one mobile terminal device, on the basis of traffic networking technology. The traffic networking technology describes electronic communication of the participants in the traffic with one another in the form of vehicle-to-vehicle (V2V), vehicle-to-road (V2R), vehicle-to-infrastructure (V2I), vehicle-to-network (V2N), and vehicle-to-people (V2P). Therefore, a motor vehicle is proposed, equipped with at least one module, which connects the various sensors and/or memory capacities in the motor vehicle to at least one other device, network, or service outside the motor vehicle. This also includes connections to the Internet, to other motor vehicles (car-to-car), to houses (car-to-home), to the manufacturer or other companies (car-to-enterprise) or to other infrastructure components (car-to-X). Motor vehicles should be able both to communicate with each other (V2V), and with their surroundings (V2X). Communication with the surroundings may, for example, take place via the infrastructure. Through data collection, early warnings of black ice, tailbacks, or other obstacles should be made possible, and road traffic should be made safer and speedier as a result. Through communication, in particular of the motor vehicles or the mobile terminal device with one another, the small distance can be utilized to create the local network by means of traffic networking technology and therefore transmit the data packet rapidly. Through traffic networking technology, in particular an increase in traffic safety and an increase in traffic efficiency can be achieved, for example through energy saving. It is possible, for example, to have recourse to various transmission media. In particular, recourse may be had to a mobile telecommunications network by means of the 4G or 5G standard. In particular, with 4G and 5G technology it is already made possible for the data packet to be transmitted between the participants directly, and thus in the present embodiment example between the electronic computing device and the mobile terminal device, without having to go via the base station, for example the central electronic computing device. Therefore, the local network can already be set up via 5G technology.

The increased speed in 4G technologies, which can also be designated as LTE, makes very high data transfer rates possible. It is thus possible to download a large amount of data very quickly. The reduced latency of 4G make it possible for the ping times to be much shorter. The ping time, also called latency, denotes the speed of reaction of the Internet. Mobile phones and Internet pages can communicate with each other more quickly. As a result, Internet pages load somewhat more quickly, and mobile surfing feels more fluid. 4G technology is in particular the successor to 3G technology. Overall, through the use of 4G technology in the method according to the invention, the data packet can therefore be transmitted more quickly from the central electronic computing device via the electronic computing device of the motor vehicle to the mobile terminal device.

5G technology is the successor to 4G technology and offers download speeds of up to 20 gigabit. In addition, 5G is said to be able to connect and network a large number of mobile terminal devices simultaneously. Using millimeter-wave technology, mobile telephony service providers want to make higher data transfer rates possible. For this, new compression technologies are used, which facilitate data transfers and reduce the load on the network. Overall, through the use of 5G technology in the method according to the invention, the data packet can therefore be transmitted even faster from the central electronic computing device via the electronic computing device of the motor vehicle to the mobile terminal device.

Moreover, it is advantageous if a cellular vehicle-to-everything technology is used as the traffic networking technology. The cellular vehicle-to-everything technology may also be called cellular vehicle-to-everything (C-V2X). Cellular vehicle-to-everything, or also LTE C-V2X, is an LTE specification for motor vehicle networking by mobile telephony. In the context of concepts such as vehicle-to-vehicle communication (V2V), vehicle-to-everything (V2X), Car2X communication (C2X), and cooperative intelligent transport systems (C-ITS), networked motor vehicles should communicate with one another, with other road users and with traffic technology in their immediate environment. For C-V2X, Network-side LTE Advanced serves as the basis. In particular, mutual communication takes place, without using a mobile telephony network router point or a mobile telephony mast. On the technical side, direct communication takes place in the 5.9 GHz band and is optimized with respect to high range and short latency. The LTE expansion makes the transfer of data between V2X participants possible without a mobile telephony network. This speeds up transfer and saves network capacity. However, the data may also be sent into the network or be received from there. For example, this can be carried out in order to be able to inform about dangerous situations over a greater distance and avoid subsequent accidents. C-V2X can be incorporated in the same radio module with conventional LTE. Thus, pedestrians or cyclists can also communicate with other V2X participants, in particular by means of the mobile terminal device, and improve the information situation. The foregoing applies correspondingly to C-V2X technology, which is specified for 5G mobile telephony networks, i.e., to the so-called 5G standard of 3GPP, a global cooperation of standardization bodies for standardization in mobile telephony.

Furthermore, it has proved advantageous if the transmitted data packet is transmitted from the electronic computing device to the mobile terminal device located in the vicinity of the electronic computing device. This makes it possible for the local network to be set up between the electronic computing device and the mobile terminal device and therefore in particular for the transmitted data packet to be transmitted from the electronic computing device to the mobile terminal device without using the mobile telecommunications network. Improved transfer of the data packet to the mobile terminal device is thus achieved.

In another advantageous embodiment, the data packet is transmitted from the electronic computing device to the at least one mobile terminal device as a function of a distance of the at least one mobile terminal device from the electronic computing device. In particular, this makes it possible for the local network to be set up between the mobile terminal device and the electronic computing device. In particular, local networks are dependent on their distances apart. This makes it possible for a faster transfer rate to be achieved for transmitting the data packet from the electronic computing device to the mobile terminal device.

Furthermore, it is advantageous if the data packet is transmitted to another electronic computing device of another motor vehicle and, as a function of a first distance of the at least one mobile terminal device from the motor vehicle and of a second distance of the at least one mobile terminal device from the other motor vehicle, it is decided by means of the central electronic computing device, from which electronic computing device of the motor vehicles the data packet is transmitted locally to the at least one terminal device. In other words, the data packet is transmitted to the motor vehicle and the other motor vehicle. If the mobile terminal device is closer to the motor vehicle, the data packet is transmitted from the electronic computing device to the mobile terminal device. If, however, the mobile terminal device is closer to the other motor vehicle, the data packet is transmitted by means of the other electronic computing device to the mobile terminal device. In particular, the data packet can be transmitted to yet other motor vehicles. In particular, for this purpose the central electronic computing device can maintain a register of which motor vehicles have the data packet. Then by means of an algorithm, it is possible to find the motor vehicle that is located in the vicinity of the mobile terminal device, and which is then triggered to transmit the data packet to the mobile terminal device. An improved transfer rate for the data packet is achieved thereby.

Moreover, it has proved advantageous if it is decided, as a function of a particular mobile telephony bandwidth of the motor vehicle or of the other motor vehicle, by which electronic computing device of the motor vehicles the data packet is transmitted locally to the at least one mobile terminal device. In particular, if for example the bandwidth of the motor vehicle is already exhausted, it may be decided that the data packet is retrieved by the other motor vehicle. An improvement of the transfer rate for transmitting the data packet to the mobile terminal device can be achieved in this way.

In a further advantageous embodiment, in the case of incomplete transfer of the data packet from the electronic computing device to the mobile terminal device, the transmission process can be taken over by another electronic computing device of another motor vehicle of the network system. If it should be found, for example, that only 95% of the data packet was transferred, this can prevent the data packet being transmitted again from the beginning. Thus, the other motor vehicle is entrusted with the task of transferring the data packet to the mobile terminal device, i.e., in particular the remaining 5%. As a result, in particular a faster data transfer of the data packet to the mobile terminal device can be achieved, with a simultaneous saving of transfer rates.

Furthermore, it is advantageous if, in the case of incomplete transfer, the transferred part of the other electronic computing device is transmitted in an information packet, and the non-transferred part is transmitted by the other electronic computing device to the at least one mobile terminal device. If for example 95% of the data packet were to be transmitted by the electronic computing device, then this is communicated in the information packet of the other electronic computing device, so that this only transfers the remaining 5% to the mobile terminal device. This can prevent the whole data packet being transmitted again. In particular, a faster data transfer to the mobile terminal device may be achieved thereby.

In a further advantageous embodiment, the information packet is signed cryptographically by the electronic computing device and/or the information packet is encrypted asymmetrically by the electronic computing device. In particular, the original data packet, and the current memory newly occupied with the calculation, are first signed cryptographically by the electronic computing device and then transmitted asymmetrically encrypted to the other motor vehicle or to the other electronic computing device. This can test both cryptographic methods and, if successful, transfer this information into the memory of its own control equipment. In particular, it may be envisaged for this purpose that the electronic computing device and the other electronic computing device are configured substantially similarly, in particular with similar computing power. This prevents different arithmetic operations being carried out for processing the data packet. Improved transfer of the data packet to the mobile terminal device may be achieved thereby.

According to a further advantageous embodiment, the taking over of the transfer of the data packet from the other electronic computing device by means of the electronic computing device and/or by means of the other electronic computing device is communicated to the central electronic computing device. Therefore, the central electronic computing device is only informed that the other motor vehicle is now tasked with the processing or transfer of the data packet. The transfer of the data packet itself still remains in the motor vehicle or in the other motor vehicle. It may further be envisaged, for example to exclude tampering, that the central electronic computing device can optionally contradict this transfer operation. A reliable, quicker transfer of the data packet to the mobile terminal device can be achieved thereby.

Moreover, it has proved advantageous if the data packet is divided by the central electronic computing device and/or by the electronic computing device into at least two partial data packets, and the at least two partial data packets are in each case transmitted to the mobile terminal device and another mobile terminal device, wherein the partial data packet is processed by a particular mobile terminal device. In other words, the mobile terminal devices can be used for solving partial calculation tasks. In particular, grid computing or edge computing may be provided thereby. Calculation tasks that were, for example, transferred to the central computing device are divided into the at least two partial data packets, which are then also called partial problems, and a respective partial problem may then be transferred via the electronic computing device to the two mobile terminal devices, which once again can solve the respective partial problem. In particular, it may be envisaged, if, for example, the data packet is divided into the partial packets by the electronic computing device, that the division is then communicated by the electronic computing device to the central electronic computing device and in particular it is also communicated to which mobile terminal device the respective partial problems are/were transferred.

Furthermore, it is advantageous if the respective processed partial data packet is transmitted by the respective mobile terminal device back to the electronic computing device and/or to the central electronic computing device. In this way, for example the solved partial problem can be transferred back to the central electronic computing device, which can then again solve the complete problem based on the first partial problem and the second partial problem. Grid computing or edge computing can be provided thereby.

For solving the partial problems, it is in particular advantageous if the partial data packet is transmitted locally to the mobile terminal device, because in particular the data packets or the partial data packets can be transferred quickly locally. This makes quicker solution of the partial problems possible, which in its turn makes quicker solution of the complete problem possible.

A further aspect of the invention relates to a network system for transmitting a data packet to at least one mobile terminal device, with a central electronic computing device and with at least one motor vehicle with an electronic computing device, wherein the network system is configured for carrying out a method according to the preceding aspect and an advantageous embodiment thereof. In particular, the method is carried out by means of the network system.

Advantageous embodiments of the method are to be regarded as advantageous embodiments of the network system. The network system has concrete features for this purpose, which make carrying out of the method, and an advantageous embodiment thereof, possible.

Further advantages, features or details of the invention can be seen from the following description as a preferred embodiment example and from the drawings. The features and combination of features stated above in the description and the features and combination of features shown hereunder in the description of the figures and/or only shown in the single FIGURE are usable not only in the combination given in each case, but also in other combinations and alone, while remaining within the scope of the invention.

BRIEF DESCRIPTION OF THE DRAWING

The sole FIGURE shows a schematic side view of an embodiment of the network system.

In the FIGURE, identical or functionally equivalent elements have the same reference symbol.

DETAILED DESCRIPTION

The sole FIGURE shows, in a schematic side view, an embodiment of a network system 10. The network system 10 is configured for transmitting a data packet 12 to at least one mobile terminal device 14. The network system 10 has a central electronic computing device 16. The network system 10 also has at least one motor vehicle 18 with an electronic computing device 20.

In the method for transmitting the data packet 12 from the central electronic computing device 16 to the at least one mobile terminal device 14, the data packet 12 is transmitted to the electronic computing device 20 of the motor vehicle 18 by means of a mobile telecommunications network 22.

It is envisaged that the transmitted data packet is transmitted locally from the electronic computing device 20 by means of a local network 24, which is created by means of the electronic computing device 20, to the at least one mobile terminal device 14.

In particular, the data packet 22 is therefore stored in a memory device of the electronic computing device 20 and is made ready for retrieval by the mobile terminal device 14.

In particular, it may be envisaged for this purpose that on the basis of traffic networking technology, the transmitted data packet is transmitted locally to the at least one mobile terminal device 14.

It may further be envisaged that a cellular vehicle-to-everything technology is used as the traffic networking technology. The cellular vehicle-to-everything technology may also be called cellular vehicle-to-everything (C-V2X). Cellular vehicle-to-everything, or also LTE C-V2X, is an LTE specification for motor vehicle networking by mobile telephony. In the context of concepts such as vehicle-to-vehicle communication (V2V), vehicle-to-everything (V2X), Car2X communication (C2X), and cooperative intelligent transport systems (C-ITS), networked motor vehicles 18 should communicate with one another, with other road users, and with the traffic technology in their immediate environment. For C-V2X, network-side LTE Advanced serves as the basis. In particular, communication takes place with one another, without using a mobile telephony network router point or a mobile telephony mast. On the technical side, the direct communication is carried out in the 5.9 GHz band and is optimized with respect to high range and short latency. The LTE expansion makes the transfer of data between V2X participants possible without a mobile telephony network. This speeds up transmission and saves network capacity. The data may, however, also be sent into the network, for example to the central electronic computing device 16, or be received from there. For example, this can be carried out in order to be able to inform about dangerous situations at a greater distance and to avoid subsequent accidents. C-V2X may be incorporated in the same radio module with conventional LTE. Thus, pedestrians or cyclists can also communicate with other V2X participants, in particular by means of the mobile terminal device 14, and improve the information situation. The foregoing applies correspondingly to the C-V2X technology, which is specified for 5G mobile telephony networks, and thus for the so-called 5G standard of the 3GPP, a global cooperation of standardization bodies for standardization in mobile telephony.

Furthermore, it has proved advantageous if the transmitted data packet 12 is transmitted from the electronic computing device 20 to the mobile terminal device 14 located in the vicinity of the electronic computing device 20. This makes it possible for the local network 24 to be set up between the electronic computing device 20 and the mobile terminal device 14 and therefore the transmitted data packet 12 can be transmitted from the electronic computing device 20 to the mobile terminal device 14 in particular without using the mobile telecommunications network 22. Improved transfer of the data packet 12 to the mobile terminal device 14 is thus achieved.

Moreover, it may in particular be envisaged that the data packet 12 is transmitted from the electronic computing device 20 to the at least one mobile terminal device 14 as a function of a first distance A1 of the at least one mobile terminal device from the electronic computing device 20.

In addition, it may be envisaged that the data packet 12 is transmitted to a further electronic computing device 26 of another motor vehicle 28 and, as a function of a first distance A1 of the at least one mobile terminal device 14 from the motor vehicle 18 and of a second distance A2 of the at least one mobile terminal device 14 from the other motor vehicle 28, it is decided by means of the central electronic computing device 16 from which electronic computing device 20, 26 of the motor vehicles 18, 28 the data packet 12 is transmitted locally to the at least one mobile terminal device 14.

In addition, it may be envisaged that, as a function of a respective mobile telephony bandwidth of the motor vehicle 18 or of the other motor vehicle 28, it is decided from which electronic computing device 20, 26 of the motor vehicles 18, 28 the data packet 12 is transmitted locally to the at least one mobile terminal device 14.

In particular, it may be envisaged that in the case of incomplete transfer of the data packet 12 from the electronic computing device 20 to the mobile terminal device 14, the transmission process is taken over by another electronic computing device 26 of the other motor vehicle 28 of the network system 10. Furthermore, in the case of incomplete transfer, the transferred part can be communicated to the other electronic computing device 26 in an information packet 30, and from the other electronic computing device 26 the non-transferred part can be transmitted to the at least one mobile terminal device 14. For this purpose, the information packet 30 may be signed cryptographically by the electronic computing device 20 and/or the information packet 30 may be encrypted asymmetrically by the electronic computing device 20.

In particular, for this purpose the taking-over of the transmission of the data packet 12 from the other electronic computing device 26 by means of the electronic computing device 20 and/or by means of the other electronic computing device 26 is communicated to the central computing device 16.

Moreover, it has proved advantageous if the data packet 12 is divided by the central electronic computing device 16 and/or by the electronic computing device 20 into at least two partial data packets, and the at least two partial data packets are in each case transmitted to the mobile terminal device 14 and a further mobile terminal device, wherein the partial data packet is processed by a respective mobile terminal device 14. In other words, the mobile terminal devices 14 can be used for solving partial calculation tasks. In particular, grid computing or edge computing may be provided thereby. Calculation tasks that are, for example, transferred to the central computing device 16 are divided into the at least two partial data packets, which are then also called partial problems, and a respective partial problem may then be transmitted via the electronic computing device 16 to the two mobile terminal devices 14, which can in turn solve the respective partial problem.

Furthermore, it is advantageous if the respective processed partial data packet is transmitted from the respective mobile terminal device 14 back to the electronic computing device 20 and/or to the central electronic computing device 16. In this way, for example the solved partial problem can be transferred back to the central electronic computing device 16, which can then solve the complete problem, again based on the first partial problem and the second partial problem. Grid computing or edge computing can be provided thereby.

In particular, the invention makes use of a possibility, 4G or 5G mobile telephony technology, which makes it possible for the data packet 12 to be transmitted directly between the participants, in the present embodiment example the motor vehicle 18, the other motor vehicle 28 and the mobile terminal device 14, without having to go via the central electronic computing device 16. For this purpose, it may, in particular, be envisaged that the data packet 12 is stored in each case on a previously agreed number of motor vehicles 18, 28. Each of these motor vehicles 18, 28 has the mobile telephony connections, in other words the mobile telecommunications network 22. The mobile terminal device 14, which may be configured for example as a laptop, smartphone or as another motor vehicle, would now like to retrieve this data packet 12. An algorithm in the background determines, in particular anonymizes, the location of the mobile terminal device 14 and consults a register of all motor vehicles 18, 28 in order to find the motor vehicle 18, 28 that is the shortest distance A1, A2 from the mobile terminal device 14 and in particular still has unused mobile telephony bandwidth. This motor vehicle 18, 28 is now triggered to transmit the data packet 12 to the mobile terminal device 14.

In particular, for example in a rural area, a fast transfer rate can be achieved for this, because shorter distances for transmitting the data packet 12 are possible. Unused electronic computing devices 20, 26 and memory in the motor vehicles 18, 28 may optionally be hired. In addition, an implicit load distribution may take place in this way, because the load on the central electronic computing device 16 is restricted to the enquiry for determining the actual information bearer, and the genuine information, or the data packet 12, is transmitted from another side.

In addition, the invention solves the problem that, for example, the incompletely transmitted data packet 12 can be transmitted by the other electronic computing device 26. Therefore, for example at 95% transmission of the data packet 12 from the electronic computing device 20 the transmission process would not be interrupted, but the remaining 5% would be transmitted from the other electronic computing device 26 to the mobile terminal device 14. In particular, for this purpose the motor vehicle 18 may independently in the parked state or while it is being parked, for example in an autonomous parking operation, but also still during the tracking battery, so that a volatile memory in the control equipment, i.e., of the electronic computing device 20, 26, is also not extinguished, to search in its environment, by means of traffic networking technology, in particular by means of car-to-car communication or mobile edge communication in accordance with the 4G or 5G standard or by means of WLAN, for the other motor vehicle 28, which accordingly start and report free calculation capacities. For this purpose, the other motor vehicle 28 is to be selected that contains an at least similar or identical electronic computing device 26 or the same microcontroller as the motor vehicle 18. Next, the original problem, in other words transmission of the data packet 12, and the current memory busy with the calculation, is first signed cryptographically and then transmitted, asymmetrically encrypted, to the other motor vehicle 28 by means of the information packet 30. This can test both cryptographic methods and if successful, transfer this information into the memory of its own control equipment. Via the central electronic computing device 16, to which the solution of the problem is to be reported, it is only communicated that the solution of the problem has been passed on and that the other motor vehicle 28 is now tasked with it. In order to exclude tampering, the central electronic computing device 16 may optionally terminate the transfer operation. Better utilization of resources may be achieved thereby.

Overall, the invention shows a local distribution of data packets 12 and calculations.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for transmitting a data packet from a central electronic computing device to at least one mobile terminal device via a network system, the method comprising:
    transmitting the data packet to an electronic computing device of a motor vehicle of the network system via a mobile telecommunications network; and
    transmitting the data packet locally from the electronic computing device to the at least one mobile terminal device via a local network, wherein the local network is created by the electronic computing device,
    wherein the data packet is transmitted to another electronic computing device of another motor vehicle and, as a function of a first distance of the at least one mobile terminal device from the motor vehicle and of a second distance of the at least one mobile terminal device from the another motor vehicle, the central electronic computing device determines whether the electronic computing device or the another electronic computing device locally transmits the data packet to the at least one mobile terminal device.

2. The method of claim 1, wherein based on traffic networking technology, the transmitted data packet is transmitted locally to the at least one mobile terminal device.

3. The method of claim 2, wherein the traffic networking technology is a cellular vehicle-to-everything technology.

4. The method of claim 1, wherein the data packet is transmitted from the electronic computing device to the at least one mobile terminal device, which is located in the vicinity of the electronic computing device.

5. The method of claim 1, wherein as a function of a respective mobile telephony bandwidth of the motor vehicle and of the another motor vehicle, it is determined whether the electronic computing device or the another electronic computing device locally transmits the data packet to the at least one mobile terminal device.

6. The method of claim 1, wherein, in an event of an incomplete transfer of the data packet from the electronic computing device to the at least one mobile terminal device, the transmission process is taken over by the another electronic computing device of the another motor vehicle of the network system.

7. The method of claim 6, wherein in the event of the incomplete transfer of the data packet by the another electronic computing device, the incomplete transfer is communicated in an information packet, and an untransmitted part is transmitted from the another electronic computing device to the at least one mobile terminal device.

8. The method of claim 7, wherein the information packet is signed cryptographically by the electronic computing device or the information packet is encrypted asymmetrically by the electronic computing device.

9. The method of claim 7, wherein taking-over of transmission of the data packet from the other electronic computing device by the electronic computing device or means of the other electronic computing device is communicated to the central electronic computing device.

10. The method of claim 1, wherein the data packet is divided by the central electronic computing device or by the electronic computing device into at least two partial data packets, and wherein the at least two partial data packets are in each case transmitted to the at least one mobile terminal device and another mobile terminal device, wherein the partial data packet is processed by a respective mobile terminal device.

11. The method of claim 10, wherein a respective processed partial data packet is transmitted from the at least one mobile terminal device back to the electronic computing device or to the central electronic computing device.

12. A network system, comprising:
   at least one mobile terminal device;
   a central electronic computing device; and
   at least one motor vehicle with an electronic computing device,
   wherein the network system the central electronic computing device is configured to transmit a data packet to the electronic computing device of the at least one motor vehicle via a mobile telecommunications network, and
   wherein the electronic computing device is configured to transmit the data packet locally to the at least one mobile terminal device via a local network, and
   wherein the electronic computing device is configured to create the local network,
   wherein the data packet is transmitted to another electronic computing device of another motor vehicle and, as a function of a first distance of the at least one mobile terminal device from the motor vehicle and of a second distance of the at least one mobile terminal device from the another motor vehicle, the central electronic computing device determines whether the electronic computing device or the another electronic computing device locally transmits the data packet to the at least one mobile terminal device.

* * * * *